Sept. 2, 1969    R. BLOHM    3,464,164
FALL-THROUGH BARRIER FOR THREADED SPINDLES
Filed Jan. 30, 1967
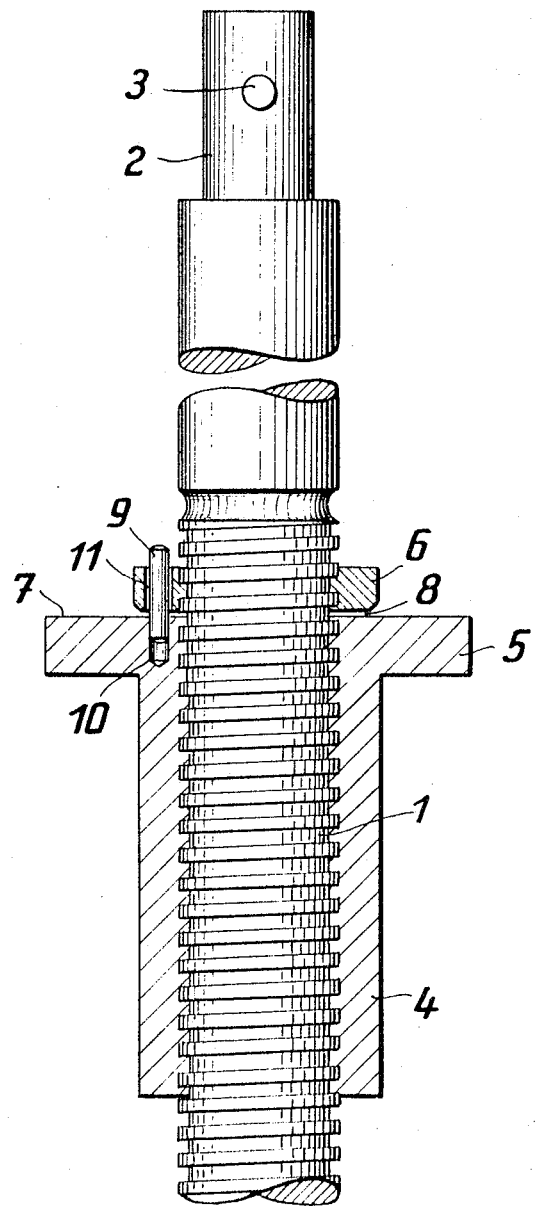
INVENTOR
Robert Blohm
BY
Beaman & Beaman
Attorneys 3,464,164
FALL-THROUGH BARRIER FOR THREADED SPINDLES
Robert Blohm, Hampchaussee 59/33,
Hamburg 80, Germany
Filed Jan. 30, 1967, Ser. No. 612,520
Claims priority, application Germany, Feb. 3, 1966,
B 85,639
Int. Cl. B24b *41/04;* B66f *3/18*
U.S. Cl. 51—168                                     1 Claim

ABSTRACT OF THE DISCLOSURE

A stationary or driven spindle for height adjustment of the grinding disk of a grinding machine cooperates with a driven or stationary nut, respectively. The nut is subjected to considerable stress due to the forces occuring with the grinding operation. The considerable wear of the nut inside thread caused thereby produces the danger of the spindle falling through the nut. A safety ring screwed on the spindle eliminates this drawback and allows a permanent and easy inspection of said wear in the course of operation.

BACKGROUND OF THE INVENTION

The invention relates to a fall-through barrier for threaded spindles preferably arranged vertically, in particular so-called height spindles for grinding machines.

With surface grinding machines comprising grinding spindle carriers guided at their columns, it is usual to adjust the height of these carriers by a threaded spindle, the so-called height-spindle, and a nut cooperating therewith.

This spindle drive is suspended either inside the column structure and the grinding spindle carrier is suspended at the threaded spindle, or the spindle drive is fitted into the column from below and carries the grinding spindle carrier. A widely known variant consists in the embodiment comprising a driven height spindle with a stationary nut or stationary spindle with a driven nut.

Normally, for the spindle, wear-resistant steel is used and for the nut, a special bronze having good sliding and bearing properties. Such a spindle nut is subjected to considerable stress so that owing to the high degree of wear caused thereby, the spindle carrier may fall through. This has already caused serious accidents in practice because with the reciprocating table in the case of longitudinal table machines or with rotating table in the case of rotary attachment machines, the spindle carrier together with the grinding disc may run into the workpiece.

The problem of the present invention consists in the provision of a security means against a falling-through of such threaded spindles, especially for so-called height spindles of grinding machines, in which on the one hand the wear of the individual threads in the nut occurring in operation may be measured and, on the other hand the device is rendered inoperable before a dangerous condition is reached.

SUMMARY OF THE INVENTION

The problem posed is solved in accordance with the invention in that the fall-through barrier for threaded spindles, especially for grinding machines with a stationary threaded spindle and rotatably arranged driven nut, consists of a threaded safety ring which is arranged on the threaded spindle spaced through a fixed distance above the threaded nut, and supported for axial displacement with respect to the nut, while being connected with the nut in a manner to be held against relative rotation with respect to the nut.

In the most simple manner, in a further development of the invention, the feature of the threaded safety ring of being held against relative rotation with respect to the nut and being capable of axial displacement with respect to the nut, may be obtained by the arrangement of at least one bolt or cam pin stationary in the flange of the nut facing towards the safety ring, said bolt extending upwardly above the plane of the flange and extending, with limited play, through a bore provided in the safety ring.

Preferably, the new fall-through barrier consists of a steel ring in the manner of an adjusting ring which has the same inside thread as the spindle nut mating the threaded spindle. This adjusting ring is disposed with its side facing the flange of the nut, at an adjusted space from the nut which may be equal to approximately half the pitch of the thread. The rotation of the adjusting ring with the nut is guaranteed by a cam pin which is fixedly inserted in a reception bore in the threaded flange of the nut and which passes through a slightly larger bore in the adjusting or safety ring.

When, during the operation of the height spindle, the thread of the nut gradually wears off, a reduction of the space between the nut and the safety ring takes place which was adjusted when the device was fitted in. The alteration of this space may be measured, thus offering a measured variable proportional to the wear of the threads of the nut which has occurred, and thus providing a continuous control of the gradually increasing wear of the thread at the nut.

With progressively increasing wear of the thread, the safety ring gradually reaches the end face of the nut facing it, and abuts thereagainst, whereby the safety ring and the nut are acting in a manner similar to counter or lock nuts and finally a blocking of the height drive takes place. With a complete wear-off of the nut thread, a fall-through of the threaded spindle through the nut is prevented because the inside thread of the safety ring which is essentially unstressed in all the phases of the operation practically is not subjected to any wear and the threaded spindle is retained by this inside thread.

In the following, the invention will be described in more detail by way of the example of embodiment shown in the attached drawing, without being restricted to the embodiment shown.

DESCRIPTION OF THE PREFERRED EMBODIMENT

The height spindle 1 is fixed at the head 2 by means of a fastening bolt 3. Nut 4 and safety ring 6 are screwed onto the thread of the spindle. The nut 4 is provided with a flange 5 radially outwardly extending at its upper end, with the safety ring 6 being arranged on the threaded spindle 1 above the upper face 7 of said flange, forming a gap 8 of a fixed dimension. The dimension of the intermediate gap 8 between the underside of the safety ring 6 and the upper face of the flange 5 of the nut is of the order of, for instance, 0.5 to 1 mm. and preferably is not to exceed half the pitch of the spindle thread.

A reception bore 10 is provided in the flange 5 of the nut 4 which bore contains a cam pin 9 extending upwardly from the upper face of the flange. The cam pin 9 extends through a bore 11 arranged in the safety ring 6 which is slightly greater in diameter than the cam pin so that rotation of the safety ring in the circumferential direction with essentially no clearance in produced when the nut 4 is rotated without impairing the axial movability with respect to the nut 4, insofar as this movability is not prevented by the thread of the spindle or the nut, respectively.

When assembling the device, the dimension of the intermediate space 8 is suitably adjusted. The change in the gap width and thus the wear of the thread of the nut may be measured at certain time intervals, which may be dependent on the load imposed on the machine. Compared to the dismantling of the machine which has so far been necessary to check such nuts, with the device in accordance with the invention, such a checking may be performed simply and quickly, and it may be decided in dependence upon the wear occurred whether the nut is to be replaced or whether it will still be able to comply with the requirements it has to meet.

If the control of the width of the gap is neglected, or is not carried out with the required accuracy, the wear of the threads of the nut may gradually increase in such an extent that the intermediate gap between the underside of the safety ring 6 and the upper face 7 of the flange 5 of the nut disappears and the safety ring comes to seat on the flange upper face of the nut. This will occur if the wear of the threads has reached the amount of the previously adjusted width of the gap. As a result, the safety ring 6 screwed down onto the flange 5 of the nut and the safety ring and the nut will be acting in a manner similar to counter or lock nuts, so that the attention of the operator will be drawn to the extent of the wear by the heavy and slow operation of arrangement. If even then no replacement of the nut is effected, a shearing of the threads in the nut may take place. The safety ring 6 preferably consists of steel, and nut 5 is preferably made of bronze. This measure is taken in an intent to impart to the threads of the safety ring which in general only has a limited thickness, an increased shearing strength in comparison with the threads of the nut 4 which has a considerable length as compared with the thickness of the safety ring. Thereby a shearing simultaneously in the threads of the safety ring and the nut is safely avoided which might render the fall-through barrier ineffective.

The example of embodiment shows a stationary threaded spindle and a rotatably arranged driven thread-nut. However, the invention may be equally employed to advantage when the arrangement is reversed.

What I claim is:

1. A safety device for a machine tool including a vertically disposed threaded shaft having a supporting feed nut threaded thereon comprising, in combination, a vertically disposed shaft having threads defined thereon, a nonferrous feed nut having a threaded bore threaded upon and supporting said shaft and including an upper end having a radial flange defined thereon, an upwardly disposed surface defined on said feed nut flange, an exteriorly unconfined steel safety ring having a threaded bore threaded upon said shaft above said feed nut and including a lower surface adjacent to, but initially normally spaced from said feed nut flange upwardly disposed surface a distance not greater than one-half of the pitch of the shaft thread, a pin mounted in said feed nut extending from said upwardly disposed flange surface and substantially parallel to the length of said shaft, a bore defined in said safety ring receiving said pin, said pin receiving bore being of a larger diameter than said pin whereby axial displacement between said nut and safety ring may freely occur and rotation of said nut on said shaft rotates said safety ring on said shaft wherein wearing of the threads of said feed nut causes a closing of the separation between said surfaces of said feed nut flange and safety ring which may be visually observed, and said safety ring prevents said shaft from falling through said feed nut upon failure of the feed nut threads.

References Cited

UNITED STATES PATENTS

| 3,176,963 | 4/1965 | Strum | 254—103 |
| 3,323,777 | 6/1967 | McMullen | 254—103 |

FOREIGN PATENTS 1,202,456  10/1965  Germany.

JAMES L. JONES, Jr., Primary Examiner

U.S. Cl. X.R.

254—103